(12) United States Patent
Huang et al.

(10) Patent No.: US 11,518,123 B2
(45) Date of Patent: Dec. 6, 2022

(54) FABRICATION METHOD FOR MICRO-/NANOSTRUCTURED COMPOUND-EYE ARRAYS WITH HYDROPHOBICITY AND LIGHT TRAPPING AND APPLICATIONS THEREOF

(71) Applicant: South China University Of Technology, Guangdong (CN)

(72) Inventors: Hanxiong Huang, Guangdong (CN); Heng Xie, Guangdong (CN)

(*) Notice: Subject to any disclaimer, the term of this patent is extended or adjusted under 35 U.S.C. 154(b) by 129 days.

(21) Appl. No.: 17/252,320

(22) PCT Filed: Oct. 19, 2018

(86) PCT No.: PCT/CN2018/110983
§ 371 (c)(1),
(2) Date: Dec. 15, 2020

(87) PCT Pub. No.: WO2019/237618
PCT Pub. Date: Dec. 19, 2019

(65) Prior Publication Data
US 2021/0260794 A1 Aug. 26, 2021

(30) Foreign Application Priority Data
Jun. 15, 2018 (CN) .......................... 201810620898.0

(51) Int. Cl.
*B29D 11/00* (2006.01)
*B29C 33/38* (2006.01)
(Continued)

(52) U.S. Cl.
CPC .... *B29D 11/00298* (2013.01); *B29C 33/3842* (2013.01); *B29C 45/26* (2013.01);
(Continued)

(58) Field of Classification Search
CPC .............. B29C 33/3842; B29C 45/26; B29C 2045/0094; B29D 11/00298; B29L 2011/0016
See application file for complete search history.

(56) References Cited

U.S. PATENT DOCUMENTS 8,115,920 B2 * 2/2012 Zhang .................. G01N 21/658
356/301

FOREIGN PATENT DOCUMENTS

CN 107199671 * 9/2017

* cited by examiner

*Primary Examiner* — Mathieu D Vargot
(74) *Attorney, Agent, or Firm* — Prakash Nama; Global IP Services, PLLC (57) ABSTRACT

The present invention relates to micro-/nanostructured compound-eye arrays and fabrication method thereof, and discloses a fabrication method and applications for the molded polymer parts with the micro-/nanostructured compound-eye arrays on their surfaces, which exhibit both hydrophobicity and light trapping. The fabrication method for the molded polymer parts with the micro-/nanostructured compound-eye arrays includes following steps. A flexible microlens array template is assembled; the flexible microlens array template is fixed on an injection mold cavity, and a polymer part with microlens arrays distributing on its surface is molded by using injection molding; the microlens arrays on the molded polymer part are imprinted onto the surface of an ultra-pure aluminum foil, nanopores are formed on its surface via anode oxidation, and so an aluminum template with negative micro-/nanostructured compound-eye arrays is fabricated; the aluminum template is fixed on an injection mold cavity, and a polymer part with micro-/nanostructured compound-eye arrays distributing on its surface is molded by using injection molding. The dual-level compound-eye arrays (orderly distributed convex
(Continued)

semi-sphere microlens and densely distributed nanopillars) are developed on the surface of the molded polymer part, which exhibits both hydrophobicity and light trapping.

10 Claims, 8 Drawing Sheets

(51) Int. Cl.
*B29C 45/26* (2006.01)
*B29C 45/00* (2006.01)
*B29L 11/00* (2006.01)

(52) U.S. Cl.
CPC ............... *B29C 2045/0094* (2013.01); *B29L 2011/0016* (2013.01)

FABRICATION METHOD FOR MICRO-/NANOSTRUCTURED COMPOUND-EYE ARRAYS WITH HYDROPHOBICITY AND LIGHT TRAPPING AND APPLICATIONS THEREOF

BACKGROUND OF THE INVENTION

The present invention relates to micro-/nanostructured compound-eye arrays and fabrication method thereof, and particularly to a fabrication method and applications for the molded polymer parts with micro-/nanostructured compound-eye arrays on their surfaces, which exhibit both hydrophobicity and light trapping.

Nowadays, miniaturization, integration, and structure array become important development directions of optical systems. Bioinspired compound-eye structure arrays have prominent advantages, such as wide field of view, high sensitivity and high integration. Compound-eye arrays with both light trapping and hydrophobicity have attracted tremendous attention as a wide variety of photovoltaic, optical, and imaging applications, such as optical imaging, solar cells, light-emitting devices, and anti-icing.

Different methods, such as nanoimprint, soft lithography, e-beam lithography, and self-assembly, have been employed for fabricating compound-eye structure arrays. Existing methods can be generally divided into two categories: bottom-up method and top-down method. Molding method is preferred for preparation of compound-eye arrays to meet the demand of different applications. However, fabricating mold insert with negative compound-eye feature by traditional bottom-up or top-down method is costly or time-consuming. Therefore, efficient and low-cost methods for fabricating mold insert with compound-eye arrays are highly desirable. Accurately replicating the micro-/nanostructures on mold insert is a major challenge for massively fabricating compound-eye arrays. It is also a difficulty to purposefully adjusting the dimensions, geometry, and distribution of micro-/nanostructured compound-eye arrays on polymer part surfaces to form specific wettability and/or light trapping property.

BRIEF SUMMARY OF THE INVENTION

An object of the present invention is to overcome the aforementioned shortcomings of the available relevant technologies and to provide a fabrication method for the micro-/nanostructured compound-eye arrays on molded polymer parts, which exhibit hydrophobicity and light trapping.

Another object of the present invention is to provide the applications of the molded polymer parts with micro-/nanostructured compound-eye arrays on their surfaces.

Said fabrication method for the micro-/nanostructured compound-eye arrays with hydrophobicity and light trapping is characterized in that the method includes following steps:

(1) According to the required geometry of the microlens arrays for use, a flexible microlens array template is assembled by pasting a flexible film on a porous plate;

(2) Said flexible microlens array template is fixed on an injection mold cavity; said injection mold is heated to a given temperature; an injection molding machine injects polymer melt into said injection mold cavity; then a polymer part with microlens arrays distributing on its surface is molded;

(3) Said molded polymer part with the microlens arrays on its surface is used as a template for imprinting to form a negative feature of the microlens arrays on the surface of an ultra-pure aluminum foil; anode oxidation is subsequently performed on said aluminum foil to form nanopores on its surface; so an aluminum template with negative micro-/nanostructured compound-eye arrays is fabricated;

(4) Said aluminum template with negative compound-eye arrays is fixed on an injection mold cavity; said injection mold is heated to a given temperature; an injection molding machine injects polymer melt into said injection mold cavity; then a polymer part with micro-/nanostructured compound-eye arrays distributing on its surface is molded.

Preferably, said fabrication method for the micro-/nanostructured compound-eye arrays with hydrophobicity and light trapping is characterized in that for said flexible microlens array template in said step (1), microholes evenly distribute in said porous plate; the cross-sectional shape of the microholes is round or ellipse, and their diameter and pitch are all micron-sized.

Preferably, said fabrication method for the micro-/nanostructured compound-eye arrays with hydrophobicity and light trapping is characterized in that for said flexible microlens array template in said step (1), said flexible film is made of poly(ethylene terephthalate) or polypropylene and has a micron-sized thickness.

Preferably, said fabrication method for the micro-/nanostructured compound-eye arrays with hydrophobicity and light trapping is characterized in that in said step (2), said injection molding machine is employed to plasticize and melt a polymer and inject the polymer melt into said injection mold cavity with the flexible microlens array template fixed on its surface; said flexible film on the top of said porous plate is deformed to arc-like profiles towards into the microholes and a certain amount of the melt is squeezed into the microholes in said porous plate under melt filling pressure or at the same time compression force; the melt in said mold cavity is packed and cooled down and the mold is opened, and then molded polymer part, on which the microlens arrays distribute orderly and periodically, is taken out of said mold cavity.

Preferably, said fabrication method for the micro-/nanostructured compound-eye arrays with hydrophobicity and light trapping is characterized in that for said molded polymer part in said step (2), the diameter, height, and pitch of the microlens are all micron-sized.

Preferably, said fabrication method for the micro-/nanostructured compound-eye arrays with hydrophobicity and light trapping is characterized in that for said step (3), the thickness of said ultra-pure aluminum foil is 0.1 2 mm; said aluminum foil is pasted tightly with the surface of said molded polymer part with the microlens arrays, and is placed in a molding machine; by applying a molding pressure, the microlens arrays on said molded polymer part are imprinted onto said aluminum foil, and a negative feature of the microlens arrays is formed on its surface; nanopores are formed on the surface of said aluminum foil with the microlens arrays via anode oxidation, in which the pretreated aluminum foil is used as working electrode and a stainless-steel plate as counter electrode; said nanopores are cylinder, sphere, or cone in shape; so an aluminum template with negative micro-/nanostructured compound-eye arrays is fabricated.

Preferably, said fabrication method for the micro-/nanostructured compound-eye arrays with hydrophobicity and light trapping is characterized in that in said step (4), said injection molding machine is employed to plasticize and melt a polymer and inject the polymer melt into said injection mold cavity with said aluminum template with the negative compound-eye arrays fixed on its surface; said polymer melt is filled into the micro feature and nanopores in said aluminum template under melt filling pressure or at the same time compression force; the melt in said mold cavity is packed and cooled down and the mold is opened, and then molded polymer part, on which the micro-/nanostructured dual-level compound-eye arrays (orderly distributed convex semi-sphere microlens and densely distributed nanopillars) are developed, is taken out of said mold cavity; said molded polymer part exhibits both hydrophobicity and light trapping.

Preferably, said fabrication method for the micro-/nanostructured compound-eye arrays with hydrophobicity and light trapping is characterized in that on the molded polymer part in said step (4), the diameter, height, and pitch of the microlens are all micron-sized, and said nanopillars are cylinder, sphere, or cone in shape.

Preferably, said fabrication method for the micro-/nanostructured compound-eye arrays with hydrophobicity and light trapping is characterized in that in said steps (2) and (4), said flexible microlens array template and said aluminum template with negative compound-eye arrays are fixed on said injection mold cavity by a screw thread type or a clamping slot type; the polymer used for the injection molding is polyethylene, polypropylene, polystyrene, poly (methyl methacrylate), polycarbonate, poly(vinylidene fluoride), cycloolefin copolymer or polyurethane.

The underlying mechanism for the molded polymer part in said step (2) can be described as follows. During injection molding, the melt filling pressure or at the same time compression force results in the deformation of said flexible film on the top of said porous plate to arc-like profiles towards into the microholes and a certain amount of the melt is squeezed into the microholes in said porous plate. The melt in said mold cavity is packed and cooled down and the mold is opened, and then the polymer part with the microlens arrays distributing orderly and periodically on its surface is fabricated. Said flexible film can be deformed to arc-like profiles with different curvatures by varying the thickness of said flexible film and/or the injection molding conditions (such as injection pressure, compression force, injection rate, and melt temperature). Subsequently, the height of the microlens on the molded polymer part in said step (2) can be adjusted.

The underlying mechanism for the molded polymer part in said step (4) can be described as follows. During injection molding, the melt filling pressure or at the same time compression force makes the polymer melt fill into the micro feature and nanopores in said aluminum template. The melt in said mold cavity is packed and cooled down and the mold is opened, and then the polymer part with the micro-/nanostructured compound-eye arrays (orderly distributed convex semi-sphere microlens and densely distributed nanopillars) on its surface is fabricated. Low aspect ratio for the semi-sphere microlens on said molded polymer part in said step (4) cannot prevent a water droplet from penetrating into the surface topography, thus forming a hydrophilic wetting state. The densely distributed nanopillars on the microlens surfaces and basement surface on said molded polymer part in said step (4) can effectively hinder a water droplet from wetting the internanopillar areas, in which air is trapped to form air pocket, resulting in a hydrophobic Cassie-Baxter state with a larger droplet contact angle. Furthermore, the orderly distributed convex semi-sphere microlens and densely distributed nanopillars on said molded polymer part in said step (4) play a key role in its light trapping property. Light reflectance is decreased slightly on the semi-sphere microlens due to the total internal reflection; the densely distributed nanopillars can be approximated as a homogeneous material with a gradient refractive index, which greatly suppress the reflectance at polymer/air boundary. So, said molded polymer part in said step (4) exhibits both hydrophobicity and light trapping.

Preferably, the hydrophobicity and light trapping property of the molded polymer part in said step (4) are characterized by measuring the contact angle of a microdroplet and the light reflectivity on its surface. The applications of said fabrication method for the micro-/nanostructured compound-eye arrays with hydrophobicity and light trapping are characterized in that said molded polymer part with the micro-/nanostructured compound-eye arrays can be employed in the fields of optical imaging, solar cells, anti-pollution, anti-dust, anti-icing, anti-corrosion, drag reduction, cell culture, or microfluidics.

Compared with the available relevant technologies, the present invention has the following advantages. (1) The molded polymer part with the micro-/nanostructured compound-eye arrays can be fabricated continuously and massively using a common processing equipment (injection molding machine). The fabrication procedure is simple and easy to operate. Thus, the present invention is easy to popularize in industry. (2) The fabrication method for the flexible microlens array template is easy to operate. The dimensions (diameter, height, and pitch) and distribution of the microlens on the molded polymer part with the microlens arrays can be adjusted by varying the dimensions of the microholes in the porous plate, the thickness of the flexible film and/or the injection molding conditions. (3) The fabrication procedure for the aluminum template with the negative compound-eye arrays is simple and easy to operate. The dimensions, geometry, and distribution of the nanopores on the aluminum template can be adjusted by varying the conditions in the anode oxidation. (4) The microlens arrays and micro-/nanostructured compound-eye arrays on the molded polymer parts have high replication accuracy and repeatability accuracy. Moreover, the dimensions and distribution of the micro-/nanostructured compound-eye arrays can be adjusted by varying the parameters and conditions described in aforementioned (2) and (3).

DETAILED DESCRIPTION OF THE INVENTION

The invention will be described in more detail with the aid of the embodiment and the accompanying drawings, but the mode for carrying out the invention is not limited to what described as follows.

Figure 1:
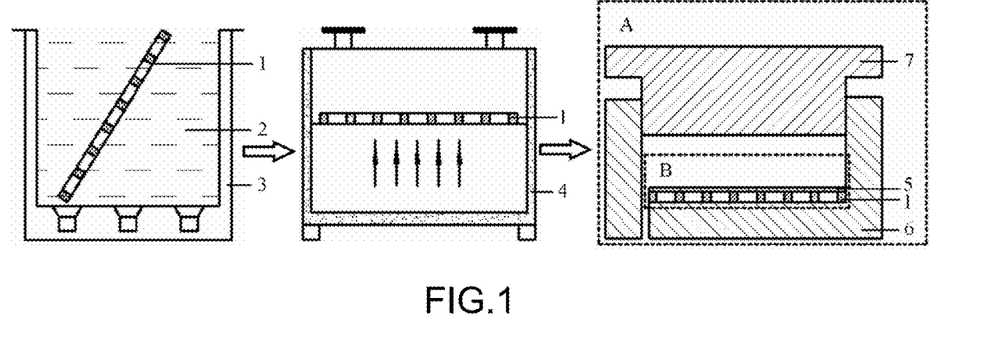
FIG. 1 is a schematic view of the preparation, assembling and fixing processes of the flexible microlens array template.

FIG. 1 schematically illustrates the preparation, assembling and fixing processes of a flexible microlens array template. A porous stainless steel plate 1 (with a thickness of 0.17 mm), on which microholes with a diameter of 250 μm and a pitch of 320 μm evenly distribute, is cleaned for 20 min in absolute alcohol 2 under the vibration of an ultrasonic oscillator 3, and then dried in an oven 4. A flexible polymer film 5 (with a thickness of 30 μm) is pasted on the porous plate 1 to assemble to a flexible microlens array template B. The flexible microlens array template B is fixed on the cavity surface of the fixed half-mold 6 in an injection mold A.

Figure 2A:
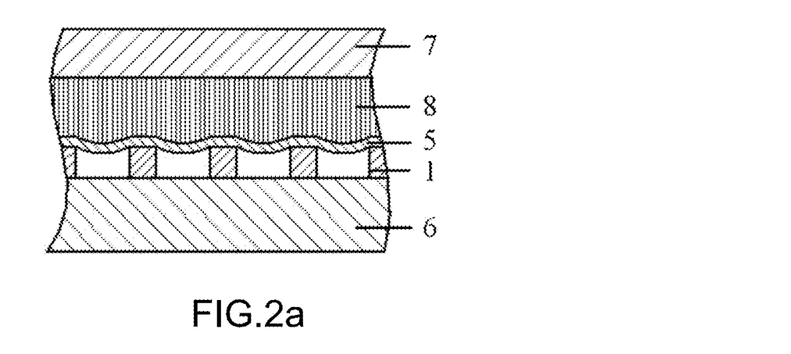
FIGS. 2a to 2c schematically show the fabrication process for the molded polystyrene part with the microlens arrays distributing on its surface.
Figure 2B:
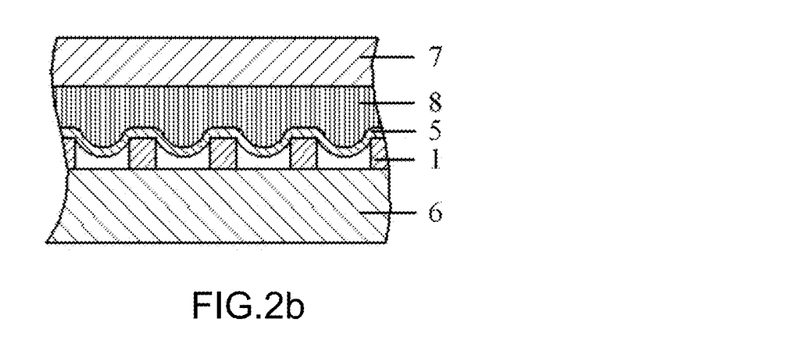
Figure 2C:
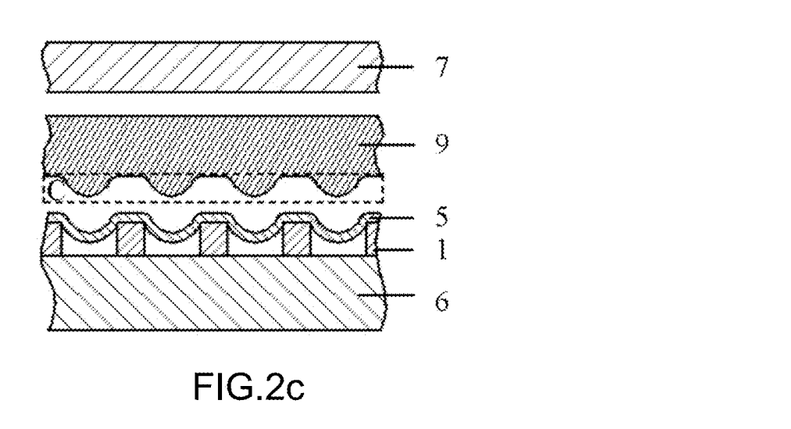

FIGS. 2*a* to 2*c* schematically show the fabrication process for a molded polystyrene part with the microlens arrays distributing on its surface. The injection mold A is heated to a temperature of 90° C. An injection molding machine (not shown here) is employed to plasticize and melt the polystyrene, and inject the polystyrene melt 8 into the cavity of the injection mold A (FIG. 2*a*), which is composed of the fixed half-mold 6 with the flexible microlens array template B fixed on its surface and the moving half-mold 7; the flexible film 5 on the top of the porous plate 1 is deformed to arc-like profiles towards into the microholes and a certain amount of the polystyrene melt 8 is squeezed into the microholes in the porous plate 1 under melt filling pressure or at the same time compression force. The polystyrene melt 8 in the injection mold A is packed and cooled down (FIG. 2*b*) and the mold A is opened, and then molded polystyrene part 9, on which the microlens arrays C distribute orderly and periodically (FIG. 2*c*), is taken out of the mold A.

Figure 3A:
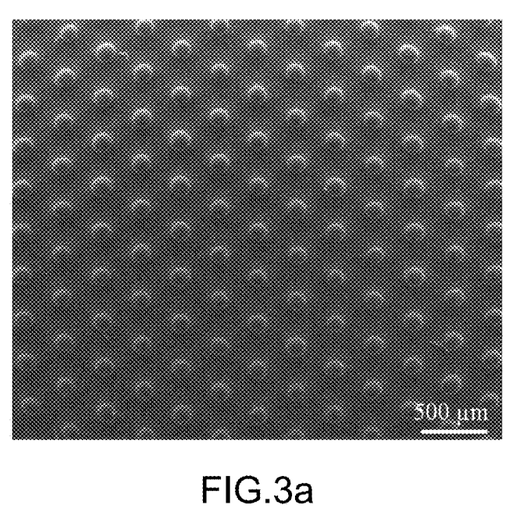
FIG. 3a is a scanning electron microscopy (SEM) micrograph of the surface on the molded polystyrene part with the microlens arrays on its surface.
Figure 3B:
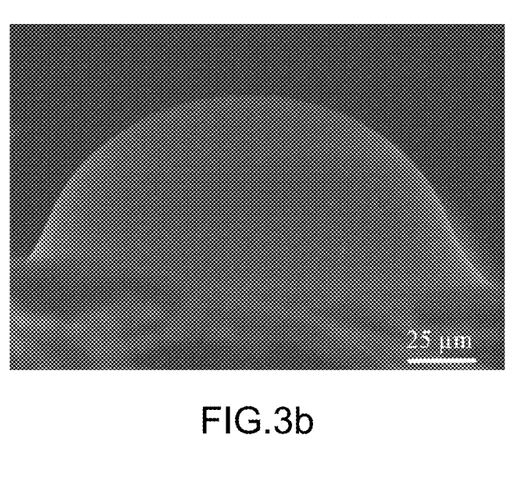
FIG. 3b is a magnified SEM micrograph (side view) of the single microlens.

FIG. 3*a* shows the scanning electron microscopy (SEM) micrograph of the surface on the molded polystyrene part 9. As can be seen, the microlenses with an average diameter of about 190 μm and an average pitch of about 320 μm distribute orderly and periodically throughout the surface of the molded polystyrene part 9. FIG. 3*b* is the magnified SEM micrograph (side view) of single microlens, which shows that the outer surface profile of the single microlens is a circular arc.

Figure 4A:
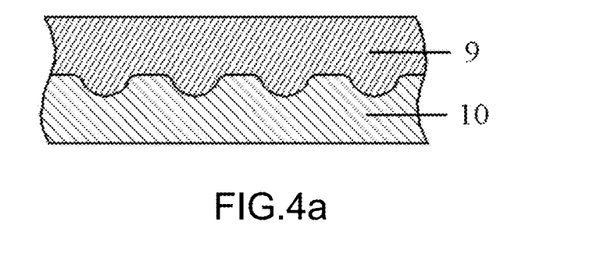
FIGS. 4a to 4c schematically show the fabrication process for the aluminum template with the negative micro-/nanostructured compound-eye arrays.
Figures 4B, 4C:
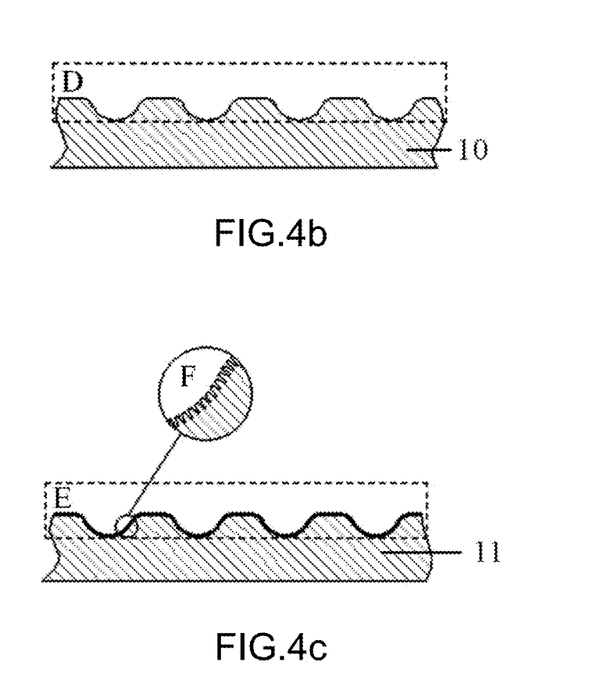

FIGS. 4*a* to 4*c* schematically show the fabrication process for an aluminum template with negative micro-/nanostructured compound-eye arrays. The molded polystyrene part 9 with the microlens arrays on its surface is used as a template for imprinting. An ultra-pure aluminum foil with a thickness of 0.5 mm is pasted tightly with the surface of the molded polystyrene part 9, and is placed in a molding machine (not shown here). By applying a molding pressure, the microlens arrays on the molded polystyrene part 9 are imprinted onto the aluminum foil (FIG. 4*a*) to form a negative feature of the microlens arrays D on its surface (FIG. 4*b*). Nanopores are formed on the surface of the aluminum foil 10 with the negative feature of the microlens arrays D via anode oxidation, in which the pretreated aluminum foil is used as working electrode and a stainless-steel plate as counter electrode. So an aluminum template 11 with negative micro-/nanostructured compound-eye arrays E is fabricated (FIG. 4*c*).

Figure 5:
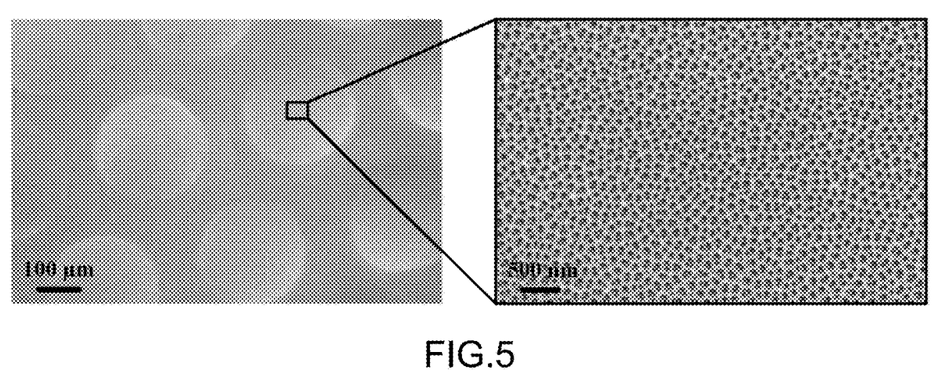
FIG. 5 shows SEM micrographs of the surface on the aluminum template with the negative compound-eye arrays.

FIG. 5 shows the SEM micrographs of the surface on the aluminum template 11. As can be seen, the microscale feature on the molded polystyrene part 9 is accurately transferred onto the aluminum template 11 via the imprinting. After the subsequent anode oxidation, dense nanopores with an average diameter of about 80 nm and an average pitch of about 200 nm are formed on the aluminum template 11 (as shown in the magnified SEM micrograph in FIG. 5). Thus, negative micro-/nanostructured compound-eye arrays are developed on the fabricated aluminum template 11.

Figure 6A:
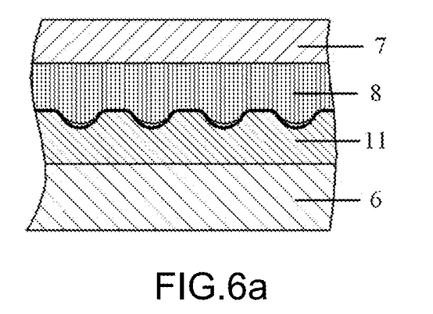
FIGS. 6a to 6c schematically illustrate the fabrication process for the molded polystyrene part with the micro-/nanostructured compound-eye arrays distributing on its surface.
Figure 6B:
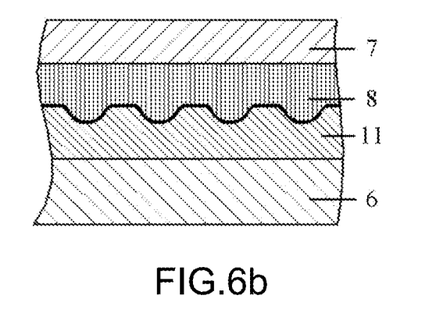
Figure 6C:
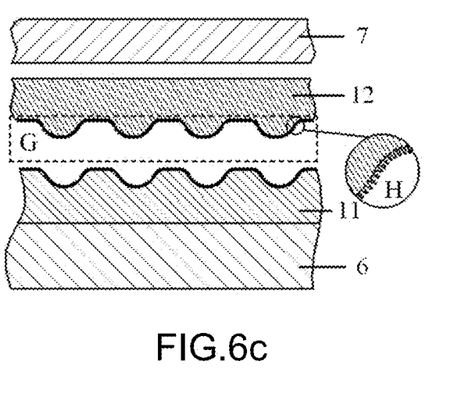

FIGS. 6*a* to 6*c* schematically illustrate the fabrication process for a molded polystyrene part with the micro-/nanostructured compound-eye arrays distributing on its surface. The aluminum template 11 with the negative compound-eye arrays is fixed on the cavity surface of the fixed half-mold 6 in an injection mold A. The injection mold A is heated to a temperature of 90° C. An injection molding machine (not shown here) is employed to plasticize and melt the polystyrene, and inject the polystyrene melt 8 into the cavity of the injection mold A (FIG. 68), which is composed of the fixed half-mold 6 and moving half-mold 7. The polystyrene melt 8 is filled into the negative micro feature and the nanopores in the aluminum template 11 under melt filling pressure or at the same time compression force. The polystyrene melt 8 in the injection mold A is packed and cooled down (FIG. 6*b*) and the mold A is opened, and then molded polystyrene part 12, on which the micro-/nanostructured dual-level compound-eye arrays (orderly distributed convex semi-sphere microlens G and densely distributed nanopillars H) are developed (FIG. 6*c*), is taken out of the mold A.

Figure 7:
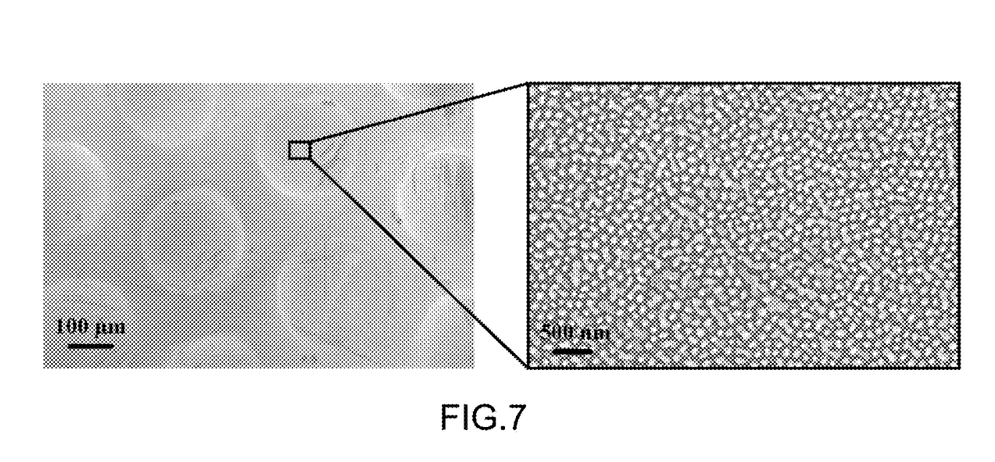
FIG. 7 is SEM micrographs of the surface on the molded polystyrene part with the micro-/nanostructured compound-eye arrays on its surface.

FIG. 7 shows the SEM micrographs of the surface on the molded polystyrene part 12. As can be seen, the convex microlens with an average diameter of about 225 μm and an average pitch of about 320 μm distribute orderly and periodically throughout the surface of the molded polystyrene part 12. More interestingly, dense nanopillars with an average diameter of about 63 nm are formed on the microlens surfaces (as shown in the magnified SEM micrograph in FIG. 7) and basement surface. That is, the micro- and nano-scale features on the aluminum template 11 are accurately replicated onto the molded polystyrene part 12 to develop the micro-/nanostructured compound-eye arrays on its surface.

Figure 8:
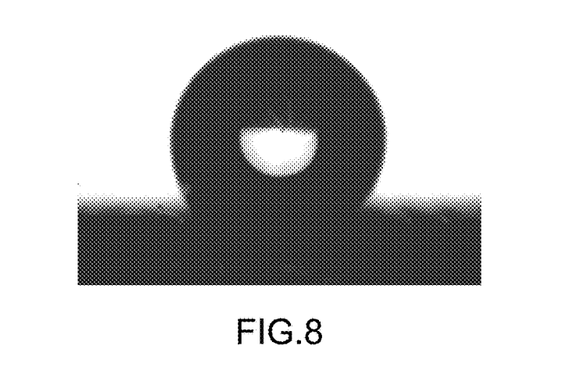
FIG. 8 is an image of a 4-μL water droplet on the molded polystyrene part with the micro-/nanostructured compound-eye arrays.
Figure 9:
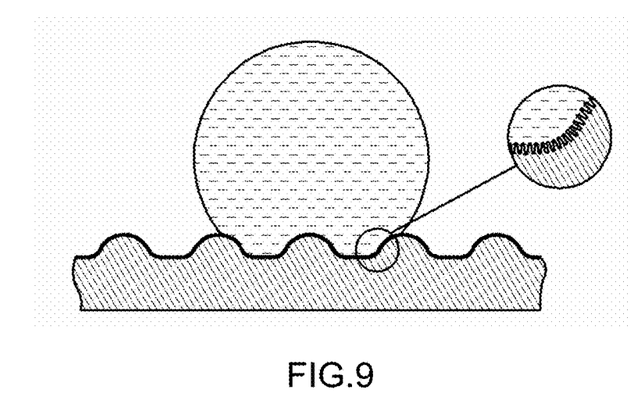
FIG. 9 shows a schematic view of the wetting state of a water microdroplet on the molded polystyrene part with the micro-/nanostructured compound-eye arrays.

Referring to FIG. 8 showing an image of a 4-μL water droplet on the molded polystyrene part 12 with the micro-/nanostructured compound-eye arrays, the droplet exhibits a contact angle of about 140°. FIG. 9 shows a schematic view of the wetting state of a water microdroplet on the molded polystyrene part 12 with the micro-/nanostructured compound-eye arrays. Low aspect ratio for the semi-sphere microlens G on the molded polystyrene part 12 cannot prevent the water droplet from penetrating into the surface topography, thus forming a hydrophilic wetting state. The densely distributed nanopillars H on the microlens surfaces and basement surface can effectively hinder the droplet from wetting the internanopillar areas, in which air is trapped to form air pocket, resulting in a hydrophobic Cassie-Baxter state with a larger droplet contact angle.

Figure 10:
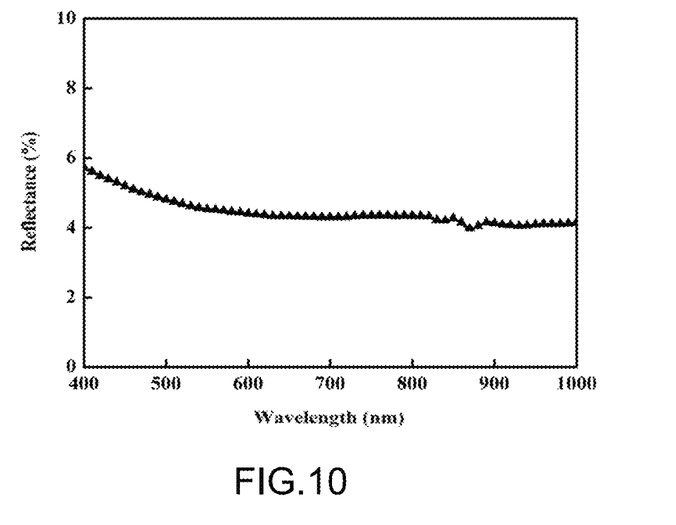
FIG. 10 illustrates a reflectance spectrum on the molded polystyrene part with the micro-/nanostructured compound-eye arrays.

FIG. 10 illustrates a reflectance spectrum on the molded polystyrene part 12 with the micro-/nanostructured compound-eye arrays. As can be seen, the molded polystyrene part 12 exhibits an average reflectance of about 4.5% in the wavelength range of 400-1000 nm. The orderly distributed convex semi-sphere microlens G and densely distributed nanopillars H on the molded polystyrene part 12 play a key role in its light trapping property. Light reflectance is decreased slightly on the semi-sphere microlens G due to the total internal reflection. The nanopillars H can be approximated as a homogeneous material with a gradient refractive index, which greatly suppress the reflectance at the polystyrene/air boundary.

The foregoing description and the drawings are illustrative of the present invention and are not to be taken as limiting, other embodiments are also allowed. Still other variants and rearrangements of parts within the spirit and scope of the present invention are possible and will be readily apparent to those skilled in the art.

What is claimed is:

1. A fabrication method for micro-/nanostructured compound-eye arrays with hydrophobicity and light trapping, wherein the method comprises the following steps:
    (1) according to a required geometry of microlens arrays for use, a flexible microlens array template is assembled by pasting a flexible film on a porous plate;
    (2) said flexible microlens array template is fixed in an injection mold cavity; an injection mold defining the injection mold cavity is heated to a given temperature; an injection molding machine injects polymer melt into said injection mold cavity; then a molded polymer part with the microlens arrays distributed on its surface is molded;
    (3) said molded polymer part with the microlens arrays on its surface is used as a template for imprinting to form a negative feature of the microlens arrays on a surface of an ultra-pure aluminum foil; anode oxidation is subsequently performed on said aluminum foil to form nanopores on its surface; so an aluminum template with negative micro-/nanostructured compound-eye arrays is fabricated;
    (4) said aluminum template with negative compound-eye arrays is fixed in the injection mold cavity; said injection mold is heated to a given temperature; the injection molding machine injects polymer melt into said injection mold cavity; then a molded polymer part with micro-/nanostructured compound-eye arrays distributed on its surface is molded.

2. The fabrication method for the micro-/nanostructured compound-eye arrays with hydrophobicity and light trapping according to claim 1, characterized in that for said flexible microlens array template in said step (1), microholes are evenly distributed in said porous plate; a cross-sectional shape of each of the microholes is round or ellipse, and a diameter and a pitch of each of the micoholes are all micron-sized.

3. The fabrication method for the micro-/nanostructured compound-eye arrays with hydrophobicity and light trapping according to claim 1, characterized in that for said flexible microlens array template in said step (1), said flexible film is made of poly(ethylene terephthalate) or polypropylene and has a micron-sized thickness.

4. The fabrication method for the micro-/nanostructured compound-eye arrays with hydrophobicity and light trapping according to claim 1, characterized in that in said step (2), said injection molding machine is employed to plasticize and melt a polymer and inject the polymer melt into said injection mold cavity with the flexible microlens array template fixed on an inner surface of the injection mold; said flexible film on a top of said porous plate is deformed to arc-like profiles towards into the microholes and a certain amount of the polymer melt is squeezed into the microholes in said porous plate under melt filling pressure or compression force; the polymer melt in said injection mold cavity is packed and cooled down and the injection mold is opened, and then the molded polymer part, on which the microlens arrays are distributed orderly and periodically, is taken out of said mold cavity.

5. The fabrication method for the micro-/nanostructured compound-eye arrays with hydrophobicity and light trapping according to claim 1, characterized in that for said molded polymer part in said step (2), a diameter, a height, and a pitch of each of the microlens are all micron-sized.

6. The fabrication method for the micro-/nanostructured compound-eye arrays with hydrophobicity and light trapping according to claim 1, characterized in that in said step (3), a thickness of said ultra-pure aluminum foil is 0.1~2 mm; said aluminum foil is pasted tightly with the surface of said molded polymer part with the microlens arrays, and is placed in a molding machine; by applying a molding pressure, the microlens arrays on said molded polymer part are imprinted onto said aluminum foil, and a negative feature of the microlens arrays is formed on its surface; nanopores are formed on the surface of said aluminum foil with the microlens arrays via anode oxidation, in which the aluminum foil being pretreated is used as working electrode and a stainless-steel plate as counter electrode; said nanopores are each in a shape of a cylinder, a sphere, or a cone; so the aluminum template with negative micro-/nanostructured compound-eye arrays is fabricated.

7. The fabrication method for the micro-/nanostructured compound-eye arrays with hydrophobicity and light trapping according to claim 1, characterized in that in said step (4), said injection molding machine is employed to plasticize and melt a polymer and inject the polymer melt into said injection mold cavity with said aluminum template with the negative compound-eye arrays fixed on its surface; said polymer melt is filled into micro feature and nanopores in said aluminum template under melt filling pressure or compression force; the polymer melt in said injection mold cavity is packed and cooled down and the injection mold is opened, and then the molded polymer part, on which micro-/nanostructured dual-level compound-eye arrays comprising orderly distributed convex semi-sphere microlens and densely distributed nanopillars are formed, is taken out of said mold cavity.

8. The fabrication method for the micro-/nanostructured compound-eye arrays with hydrophobicity and light trapping according to claim 7, characterized in that on the molded polymer part in said step (4), a diameter, a height, and a pitch of the convex semi-sphere microlens are all micron-sized, and said nanopillars are each being in a shape of a cylinder, a sphere, or a cone.

9. The fabrication method for the micro-/nanostructured compound-eye arrays with hydrophobicity and light trapping according to claim 1, characterized in that in said steps (2) and (4), said flexible microlens array template and said aluminum template with negative compound-eye arrays are fixed on said injection mold cavity by a screw thread or a clamping slot; the polymer used for injection molding is polyethylene, polypropylene, polystyrene, poly(methyl methacrylate), polycarbonate, poly(vinylidene fluoride), cycloolefin copolymer or polyurethane.

10. The fabrication method for the micro-/nanostructured compound-eye arrays with hydrophobicity and light trapping according to claim 1, wherein said molded polymer part with the micro-/nanostructured compound-eye arrays is employed in the fields of optical imaging, solar cells, anti-pollution, anti-dust, anti-icing, anti-corrosion, drag reduction, cell culture, or microfluidics; wherein hydrophobicity and light trapping property of the molded polymer part in said step (4) are characterized by measuring a contact angle of a microdroplet and light reflectivity on its surface.

* * * * *